US 7,039,833 B2
May 2, 2006

(12) United States Patent
Knuutila et al.

(54) STACK TRACE GENERATED CODE COMPARED WITH DATABASE TO FIND ERROR RESOLUTION INFORMATION

(75) Inventors: Juha P. Knuutila, Tampere (FI); Samu J. Lahti, Pori (FI)

(73) Assignee: i2 Technologies US, Inc., Dallas, TX (US)

( * ) Notice: Subject to any disclaimer, the term of this patent is extended or adjusted under 35 U.S.C. 154(b) by 564 days.

(21) Appl. No.: 10/274,761

(22) Filed: Oct. 21, 2002

(65) Prior Publication Data

US 2004/0078689 A1 Apr. 22, 2004

(51) Int. Cl.
G06F 11/00 (2006.01)
(52) U.S. Cl. .............................. 714/38; 714/26; 717/128
(58) Field of Classification Search ................. 714/26, 714/38, 45; 717/128
See application file for complete search history.

(56) References Cited

U.S. PATENT DOCUMENTS

| 5,111,384 | A | * | 5/1992 | Aslanian et al. | 714/26 |
|---|---|---|---|---|---|
| 5,790,780 | A | * | 8/1998 | Brichta et al. | 714/46 |
| 5,928,369 | A | * | 7/1999 | Keyser et al. | 714/47 |
| 6,629,267 | B1 | * | 9/2003 | Glerum et al. | 714/38 |
| 6,681,344 | B1 | * | 1/2004 | Andrew | 714/38 |
| 6,738,928 | B1 | * | 5/2004 | Brown | 714/26 |
| 6,859,893 | B1 | * | 2/2005 | Hines | 714/38 |
| 2003/0005414 | A1 | * | 1/2003 | Elliott et al. | 717/128 |

FOREIGN PATENT DOCUMENTS

JP    406259241 A  *  9/1994

OTHER PUBLICATIONS

Unknown, "Class Object," java.lang.object, Overview Package, Class: Use of tree deprecated Index Help, Java™ 2 Platform, Std. ed.v1.3.1, http://java.sun.com/j2se/1.3/docs/api/java/lang/Object.html, 9 pages, Internet Date: Oct. 14, 2002.

Unknown, "Java Language Specification," Second Edition, Table of Contents, http://java.sun.com/docs/books/jls/second_edition/html/jTOC.doc.html, 11 pages, Internet Date: Oct. 21, 2002.

* cited by examiner

*Primary Examiner*—Scott Baderman
*Assistant Examiner*—Gabriel L. Chu
(74) *Attorney, Agent, or Firm*—Brian E. Harris; James E. Walton

(57) ABSTRACT

In one embodiment, a method for automatically identifying a program error in a computer program includes receiving a program error message indicating that a new program error has occurred during execution of the program and generating a program stack trace for the new program error indicating the source of the new program error within the program. A first operation is applied to a portion of the program stack trace to generate a first numerical code associated with the new program error. The first numerical code associated with the new program error is compared to one or more stored first numerical codes associated with previously identified program errors to determine whether the new program error is the same as a previously identified program error. If so, stored information associated with resolving the previously identified program error is provided for use in resolving the new program error.

35 Claims, 5 Drawing Sheets

FIG. 3A
```
public static void func1() { func2(); }          /* 42a
public static void func2() { func3(); }          /* 42a
public static void func3()  ~42a
{
   // this is line number 141
   func_jaa();                                    /* 50a
}
public static void func_jaa()  /* 42a
{
   Vector v = null;
   v.size();
}
public static void main(String[] args)  ~42a
{
   try {
      func1();
   } catch (Exception e) {
      addLogEntry( stackCode(e) );
   }
}
```

FIG. 3B
```
public static void func1() { func2(); }          /* 42b
public static void func2() { func3(); }          /* 42b
public static void func3()  ~42b
{
   // this is line number 141
   func_jaa();                                    /* 50b
}
public static void func_jaa()  /* 42b
{
   Vector v = null;
   // new code is added here for some checking
   v.size();
}
public static void main(String[] args)  ~42b
{
   try {
      func1();
   } catch (Exception e) {
      addLogEntry( stackCode(e) ); // adds error code And stack trace to log
   }
}
```

FIG. 3C
```
public static void func1()  {  func2();  } ⟵ 42c
public static void func2()  {  func3();  } ⟵ 42c
public static void func3() ⟵ 42c
{
    // this is line number 141
    func_jaa();                              ⟵ 50c
}
public static void func_kbb() ⟵ 42c
{
    Vector v = null;
    v.size();
}
public static void main(String[] args) ⟵ 42c
{
    try {
        func1();
    } catch (Exception e) {
        addLogEntry( stackCode(e) ); // adds error code And stack trace to log
    }
}
```

FIG. 4A
```
<=============================================>
<=============================================>
    java.lang.NullPointerException 42a
        at ErrorCode.func_jaa(ErrorCode.java:148) ⟵ 44a
        at ErrorCode.func3(ErrorCode.java:142) ⟵ 44a
        at ErrorCode.func2(ErrorCode.java:138) ⟵ 44a
   42a  at ErrorCode.func1(ErrorCode.java:137) ⟵ 44a        } 40a
        at ErrorCode.main(ErrorCode.java:154) ⟵ 44a
<=============================================>
<=============================================>
    Exact match code = -643419419 ⟵ 76a
    trace code = -926815785 ⟵ 78a            } 74a  ⟵ 70a
    place code = 1680420248 ⟵ 80a
```

FIG. 4B

```
<=============================================>
<=============================================>
   java.lang.NullPointerException  42b
       at ErrorCode.func_jaa(ErrorCode.java:149)  44b
       at ErrorCode.func3(ErrorCode.java:142)  44b
       at ErrorCode.func2(ErrorCode.java:138)  44b     40b
    42b at ErrorCode.func1(ErrorCode.java:137)
       at ErrorCode.main(ErrorCode.java:155)  44b
<=============================================>
<=============================================>
   Exact match code = -1347252603  76b
   trace code = -926815785  78b          74b    70b
   place code = 1680420248  80b
```

FIG. 4C

```
<=============================================>
<=============================================>
   java.lang.NullPointerException  42c
       at ErrorCode.func_kbb(ErrorCode.java:149)  44c
       at ErrorCode.func3(ErrorCode.java:142)  44c
       at ErrorCode.func2(ErrorCode.java:138)  44c     40c
    42c at ErrorCode.func1(ErrorCode.java:137)  44c
       at ErrorCode.main(ErrorCode.java:155)  44c
<=============================================>
<=============================================>
   Exact match code = -1347252603  76c
   trace code = -349842824  78c           74c    70c
   place code = 1680420248  80c
```

US 7,039,833 B2

STACK TRACE GENERATED CODE COMPARED WITH DATABASE TO FIND ERROR RESOLUTION INFORMATION

TECHNICAL FIELD OF THE INVENTION

This invention relates generally to identifying a program error in a computer program, and more particularly to automatically identifying a program error in a computer program.

BACKGROUND OF THE INVENTION

A computer program may generate a program error during execution. It may be desirable to identify the program error and to determine a resolution for it. In some cases, the program error may have been previously identified and resolved. For example, the same program or a different program, such as a different version of the same program, previously executed within a computer network may have previously generated the same program error. In response to a new program error, a program stack trace may be automatically generated, representing a path to the source of the new program error in the program that generated the new program error. To reduce potentially duplicative work in resolving a new program error, it may be desirable to determine whether the same program error has been generated previously and, if so, whether a resolution for the program error is available. To identify the new program error, a user such as a program developer may be required to manually search previously generated program stack traces to determine whether a matching program stack trace exists for a previous program error, indicating that the previous program error is the same as the new program error. This process is often tedious, costly, and prone to human error.

SUMMARY OF THE INVENTION

According to the present invention, problems and disadvantages associated with previous techniques for identifying and resolving a program error in a computer program may be reduced or eliminated.

In one embodiment, a method for automatically identifying a program error in a computer program includes receiving a program error message indicating that a new program error has occurred during execution of the program and generating a program stack trace for the new program error indicating the source of the new program error within the program. A first operation is applied to a portion of the program stack trace to generate a first numerical code associated with the new program error. The first numerical code associated with the new program error is compared to one or more stored first numerical codes associated with previously identified program errors to determine whether the new program error is the same as a previously identified program error. If so, stored information associated with resolving the previously identified program error is provided for use in resolving the new program error.

Certain embodiments of the present invention may provide one or more technical advantages. For example, certain embodiments may uniquely identify a program error using one or more numerical codes generated according to a program stack trace for the program error. Uniquely identifying program errors according to such numerical codes may allow a new program error to be readily and automatically compared with previously identified program errors to determine whether information that may be used to resolve the new program error already exists. This may allow a user such as a program developer to avoid duplicative work, which may reduce tedium, lower development costs, and improve accuracy. In certain embodiments, multiple numerical codes may be generated for each program error according to the associated program stack trace, which may allow program errors generated in different versions of a program to be identified as the same. Systems and methods incorporating one or more of these or other technical advantages may be well suited for identifying and resolving program errors. Certain embodiments may provide all, some, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and features and advantages thereof, reference is made to the following description in conjunction with the accompanying drawings, in which:

FIGS. 3A–3C illustrate example computer programs;

FIGS. 4A–4C illustrate example program error output of computer programs; and

DESCRIPTION OF EXAMPLE EMBODIMENTS

Figures 1, 2:
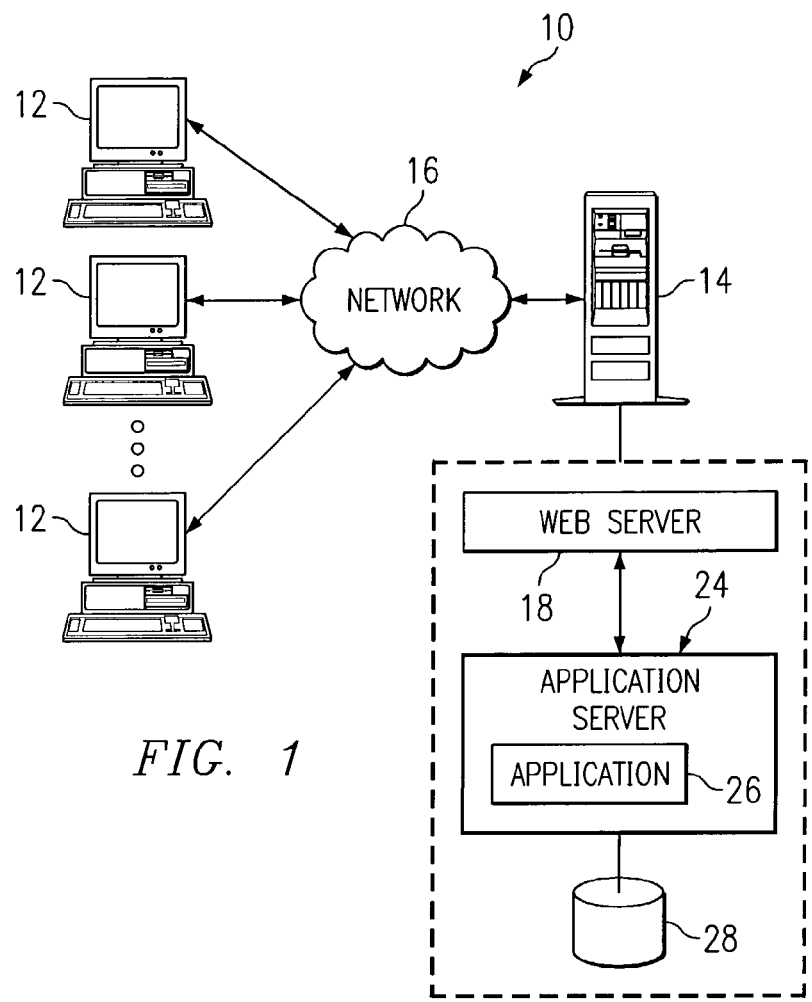
FIG. 1 illustrates an example system for automatically identifying a program error in a computer program.
FIG. 2 illustrates an example program stack trace, which may indicate the source of a program error within a computer program.

FIG. 1 illustrates an example system for automatically identifying a program error in a computer program. System 10 includes one or more client systems 12 and one or more server systems 14 coupled using a network 16. Client system 12 and server system 14 each operate on one or more computers at one or more locations. Each computer may include one or more suitable input devices, output devices, processors and associated memory, mass storage media, communications interfaces, and any other components that may be appropriate according to operation of system 10. Network 16 may include one or more local area networks (LANs), metropolitan area networks (MANs), wide area networks (WANs), portions of the global computer network known as the Internet, or any other appropriate wireline, optical, wireless, or other links.

Components of server system 14 may include a web server 18, an application server 24, an application 26 (which may be one of multiple applications associated with application server 24), and a database 28. In one embodiment, application server 24 includes a WEBLOGIC application server, WEBSPHERE application server, or other suitable application server and application 26 includes a JAVA application. However, the present invention contemplates application 26 with or without application server 24. Using a web browser or otherwise, a client system 12 may submit a request to web server 18 of server system 14 for server system 14 to execute a computer program. Web server 18 may communicate the request to application server 24, prompting application server 24 to initiate execution of the program. During execution of the program, one or more program errors may occur. Application 26 may receive a program error message, indicating that a new program error has occurred during execution of the program. Application 26 may generate a program stack trace for the new program error, which may indicate the source of the new program error within the program. Application 26 may generate one or more numerical codes associated with the new program error, compare the numerical codes associated with the new program error to one or more stored numerical codes associated with previously identified program errors, and if a match is determined provide stored information associated with resolving the matching previously identified program error for use in resolving the new program error.

Although a particular client-server environment is described as an example, the present invention contemplates any suitable computing environment. Furthermore, although application 26 is described as performing certain operations, the present invention contemplates these operations being performed using any suitable component or components associated with server system 14 or another appropriate computer system. For example, certain operations may be performed by application 26 (e.g., by one of multiple processes of application 26), by another application (e.g., by one of multiple processes of the other application), by a developer or other user associated with system 10, or in any other suitable manner. Moreover, although computer programs are described, the present invention contemplates identifying and resolving program errors in any suitable software component or code segment, whether or not referred to as a "program" in the particular language in which the software component or code segment is written.

FIG. 2 illustrates an example program stack trace 40, which may indicate the source of a new program error within a program. Program stack trace 40 may be a standard JAVA program stack trace or any other suitable program stack trace according to particular needs. In one embodiment, program stack trace 40 may be described as a path to the computer code in the program that generated the program error. For example, program stack trace 40 may indicate one or more class methods or other suitable methods 42 in the program that generated the program error. For each such method 42, program stack trace 40 may include a line number 44 of the code in method 42 where the program error was generated.

Returning to FIG. 1, application 26 may generate one or more numerical codes associated with the new program error. In one embodiment, application 26 may compare the numerical codes associated with the new program error to corresponding stored numerical codes associated with previously identified program errors to determine whether the new program error is the same as at least one of the previously identified program errors. However, this operation or operations may be performed by application 26 (e.g., by one of multiple processes of application 26), by another application (e.g., by one of multiple processes of the other application), by a developer or other user associated with system 10, or in any other suitable manner depending on the embodiment. The stored numerical codes may be stored in database 28 or at any other suitable location accessible to application 26. The stored numerical codes may be stored by previous operations of application 26 (e.g., by one of multiple processes of application 26), by another application (e.g., by one of multiple processes of the other application), by a developer or other user associated with system 10, or in any other suitable manner.

If a numerical code associated with the new program error is the same as a stored numerical code associated with a previously identified program error, application 26 may provide stored information associated with resolving the matching previously identified program error for use in resolving the new program error. For example, the stored information may include error-free code, explanatory text, a link to such code or text, a uniform resource locator (URL) or other address of such code or text, or any other suitable stored information. The stored information may have been stored by previous operations of application 26 (e.g., by one of multiple processes of application 26), by another application (e.g., by one of multiple processes of the other application), by a developer or other user associated with system 10, or in any other suitable manner depending on the embodiment. In one embodiment, if no numerical code associated with the new program error is the same as any stored numerical code associated with a previously identified program error, application 26 may store the one or more numerical codes associated with the new program error in database 28 for use in identifying subsequent program errors.

Certain embodiments of the present invention may provide one or more technical advantages. For example, certain embodiments may uniquely identify a program error using one or more numerical codes generated according to program stack trace 40 for the program error. Uniquely identifying program errors according to such numerical codes may allow a new program error to be readily and automatically compared with previously identified program errors to determine whether information that may be used to resolve the new program error already exists. This may allow a user such as a program developer to avoid duplicative work, which may reduce tedium, lower development costs, and improve accuracy. In certain embodiments, multiple numerical codes may be generated for each program error according to associated program stack trace 40, which may allow program errors generated in different versions of a program to be identified as the same.

FIGS. 3A–3C illustrate example computer programs 50, which server system 14 may execute in response to a request from client system 12. Programs 50 may each include one or more functions 42, which in a particular example may include func1, func2, func3, func_jaa, and main. While specific names and formats are given to functions 42 in programs 50, those skilled in the art will appreciate that any suitable names and formats may be used. Additionally, while specific programs 50 are described, the present invention contemplates any suitable programs 50.

When a program 50 is executing, certain functions 42 within program 50 may generate program errors as they are executing, causing program 50 to generate a program error. As an example, func_jaa in program 50a may generate a program error because func_jaa attempts to access an object that does not exist (i.e. points to null). Thus, when function main in program 50a calls func1, which calls func2, which calls func3, which calls func_jaa, a program error may be generated. Function main may contain an expression catch (Exception E), which may receive a program error message indicating that a new program error has occurred in func_jaa. Function main may also contain a function call addLog Entry(stackCode(e)), which may generate program error output, possibly including program stack trace 40 and the one or more numerical codes associated with the new program error.

FIGS. 4A–4C illustrate example program error output 70 of computer programs 50, which may be generated if a program 50 generates a program error and may be used to automatically identify the program error. Program error outputs 70a–70c illustrated in FIGS. 4A–4C, respectively, correspond to programs 50a–50c illustrated in FIGS. 3A–3C, respectively. For example, program error output 70a is generated in response to a program error occurring during execution of program 50a. While specific program error output 70 is described, those skilled in the art will appreciate that any program error output suitable for automatically identifying a program error in a program 50 may be used.

Program error output 70 may include program stack trace 40 indicating the source of the program error within program 50. Program error output 70 may also include one or more numerical codes 74 associated with the program error. A numerical code 74 may provide a numerical representation of program stack trace 40 and may uniquely identify the program error associated with program stack trace 40. In one embodiment, a numerical code 74 for a program error may be calculated by applying an operation that generates a substantially unique code to program stack trace 40 for the program error. In one embodiment, for example, a numerical code 74 for a program error may be calculated by applying a String.hashCode( ) or an Object.hashCode( ) method to program stack trace 40. For example, the operation may map an infinite universe of inputs to an integer x such that $-2,147,493,649 < x < 2,147,493,649$. The operation may be applied to all or a portion of program stack trace 40. It may be desirable to generate multiple numerical codes 74 to ensure that a new program error will be found to match a previously identified program error even though programs 50 that generated the program errors may not be identical. For example, program error output 70 may include an exact match code 76, a trace code 78, a place code 80, or any other suitable numerical codes 74.

In one embodiment, exact match code 76 may be a numerical code 74 computed when an operation that generates a substantially unique code is applied to the entire program stack trace 40 for a program error. As an example, an exact match code 76 associated with a new program error may be the same as an exact match code 76 associated with a previously identified program error when program 50 that generated the new program error is substantially identical to program 50 that generated the previously identified program error. Trace code 78 may be a numerical code 74 computed when an operation that generates a substantially unique code is applied to program stack trace 40 for a program error after deleting all line numbers 44 from program stack trace 40. As an example, a trace code 78 associated with a new program error may be the same as a trace code 78 associated with a previously identified program error when program 50 that generated the new program error has more or fewer lines of code than, but is otherwise identical to, program 50 that generated the previously identified program error. Place code 80 may be a numerical code 74 computed when an operation that generates a substantially unique code is applied to only specified lines, such as the first three lines for example, of program stack trace 40. As an example, a place code 80 associated with a new program error may be the same as a place code 80 associated with a previously identified program error when program 50 that generated the new program error includes one or more differently named functions 42 than program 50 that generated the previously identified program error.

As just an example, assume program 50a is executed and generates a program error message that is received by application 26. Application 26 may generate program error output 70a, possibly including program stack trace 40a indicating that func_jaa in program 50a is the source of the program error. Application 26 may then generate one or more numerical codes 74a providing unique identifiers for program stack trace 40a and thus for the new program error. Numerical codes 74a may include exact match code 76a, trace code 78a, place code 80a, or any other suitable numerical codes according to particular needs. Assume in this example that numerical codes 74a are stored in database 28. For example, the program error may be a new program error, such that none of the one or more numerical codes 74 for the program error match any stored numerical codes 74 of any previously identified program errors.

Continuing the example, assume program 50b is executed some time after numerical codes 74a are stored in database 28. The same code in func_jaa of program 50a that caused program 50a to generate a program error message is included in func_jaa of program 50b. Thus, when program 50b is executed, program 50b also generates a program error message that is received by application 26. Application 26 may generate program error output 70b, possibly including program stack trace 40b indicating that func_jaa in program 50b is the source of the program error. Application 26 may then generate one or more numerical codes 74b providing unique identifiers for program stack trace 40b and thus for the new program error. Thus, the same code in the same method 42 (func_jaa) that generated the program error in program 50b also generated the program error in program 50a. However, because in program 50b additional lines of code have been added to func_jaa, one or more line numbers 44b in program error output 70b may differ from corresponding line numbers 44a in program error output 70a. Thus, exact match code 76b may differ from exact match code 76a. However, trace code 78b may match trace code 78a because trace code 78 is computed after deleting line numbers 44 from program stack trace 40. Application 26 may then determine that trace code 78b associated with the new program error of program 50b is the same as stored trace code 78a associated with the previously identified program error of program 50a. Accordingly, application 26 may access database 28 to provide stored information associated with resolving the previously identified program error of program 50a for use in resolving the new program error of program 50b.

Continuing with the example, assume program 50c is executed some time after numerical codes 74a are stored in database 28. The same code in func_jaa of program 50a that caused program 50a to generate a program error message is included in program 50c. Thus, when program 50c is executed, program 50c generates a program error message that is received by application 26; however, the method 42 in program 50c containing the program error-generating line of code is named func_kbb instead of func_jaa. Application 26 may generate program error output 70c, possibly including program stack trace 40c indicating that func_kbb in computer program 50c is the source of the program error. Application 26 may then generate one or more numerical codes 74c providing unique identifiers for program stack trace 40c and thus for the new program error. Because in program 50c the name of the method 42 containing the error-generating line of code is different than the name of the method 42 in program 50a (func_kbb instead of func_jaa), one or more functions 42c in program stack trace 40c may differ from corresponding functions 42a in program stack trace 40a. Thus, exact match code 76c and trace code 78c may differ from exact match code 76a and trace code 78c, respectively. However, place code 80c may match place code 80a because place code 80 is computed using only a specified number of lines, such as the first three lines of program stack trace 40, which contain the differing function name. Application 26 may then determine that place code 80c associated with the new program error of program 50c is the same as stored place code 80a associated with the previously identified program error of program 50a. Accordingly, application 26 may access database 28 to provide stored information associated with resolving the previously identified program error of program 50a for use in resolving the new program error of program 50c.

Figure 5:
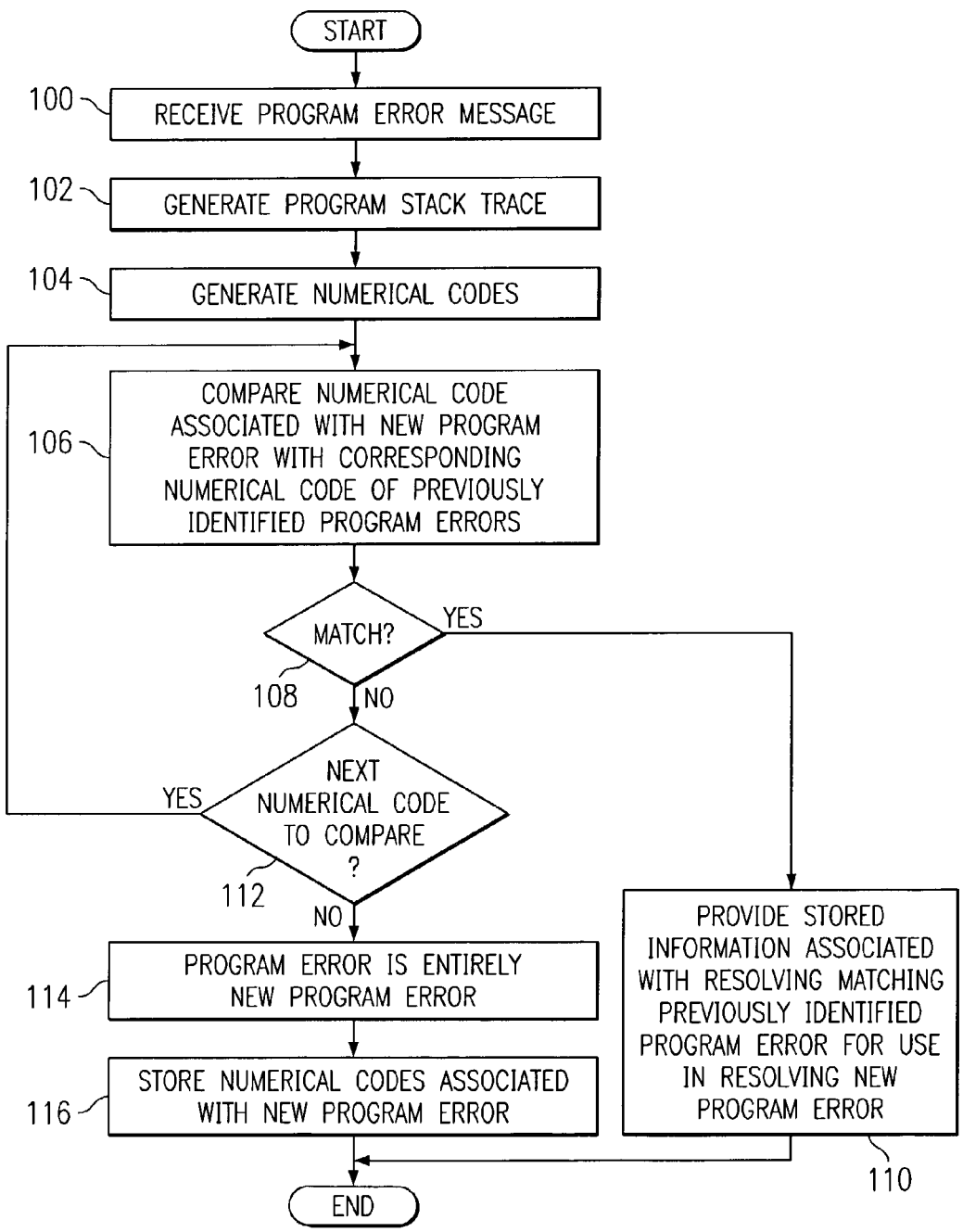
FIG. 5 illustrates an example method for automatically identifying a program error in computer program.

FIG. 5 illustrates an example method for automatically identifying a program error in a computer program 50. At step 100, application 26 of server system 14 receives a program error message indicating that a new program error has occurred during execution of program 50. At step 102, application 26 generates program stack trace 40 for the new program error, program stack trace 40 indicating the source of the new program error within program 50. At step 104, application 26 generates one or more numerical codes 74 associated with the new program error. For example, application 26 may generate exact match code 76, trace code 78, place code 80, or any other suitable numerical codes 74. At step 106, application 26 compares a first numerical code 74 associated with the new program error, such as exact match code 76 for example, to one or more corresponding stored first numerical codes 74 associated with previously identified program errors to determine whether the new program error is the same as at least one of the previously identified program errors. The stored numerical codes may be stored by previous operations of application 26 (e.g., by one of multiple processes of application 26), by another application (e.g., by one of multiple processes of the other application), by a developer or other user associated with system 10, or in any other suitable manner depending on the embodiment.

At step 108, if the first numerical code 74 associated with the new program error is the same as the first numerical code 74 of a previously identified program error, application 26 may provide stored information associated with resolving the matching previously identified program error for use in resolving the new program error at step 110. For example, the stored information may include error-free code, explanatory text, a link to such code or text, a uniform resource locator (URL) or other address of such code or text, or any other suitable stored information. The stored information may have been stored by previous operations of application 26 (e.g., by one of multiple processes of application 26), by another application (e.g., by one of multiple processes of the other application), by a developer or other user associated with system 10, or in any other suitable manner depending on the embodiment.

If the first numerical code 74 associated with the new program error is not the same as the first numerical code 74 of a previously identified program error at step 108, application 26 determines whether there is a next numerical code 74 to compare to corresponding stored numerical codes 74 of previously identified program errors at step 112. If a next numerical code 74 has been generated at step 112, such as trace code 76 for example, the method returns to step 106, where application 26 compares that numerical code 74 associated with the new program error to corresponding stored numerical codes 74 associated with previously identified program errors. The method may continue in this manner until all numerical codes 74 for the new program error generated at step 104 have been compared to corresponding stored numerical codes 74 generated for previously identified program errors. For example, in one embodiment, exact match code 76, trace code 78, and place code 80 are compared in that order. If a next numerical code 74 has not been generated at step 112, the new program error is an entirely new program error at step 114 and application 26 may store the one or more numerical codes 74 associated with the new program error at step 116 for use in identifying subsequent program errors.

The present invention contemplates the steps of the method being performed in any suitable order. For example, the first numerical code 74 associated with the new program error may be generated and compared to first numerical codes 74 associated with previously identified program errors before any other numerical codes 74 associated with the new program error are generated, a next numerical code 74 being generated only if no match is determined. As another example, all numerical codes 74 associated with the new program error (e.g., exact match code 76, trace code 78, and place code 80) may be compared to all corresponding stored numerical codes 74 associated with previously identified program errors at substantially the same time. As another example, even if a numerical code 74 associated with the new program error is the same as a corresponding stored numerical code 74 associated with a previously identified program error, one or more additional numerical codes 74 associated with the new program error may be compared to corresponding stored numerical codes 74 associated with previously identified program errors to verify or otherwise confirm that the new program error is the same as the previously identified program error.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for automatically identifying a program error in a computer program, operable to:
   receive a program error message indicating that a new program error has occurred during execution of the program;
   generate a program stack trace for the new program error indicating the source of the new program error within the program;
   apply a first operation to at least a first portion of the program stack trace for the new program error to generate a first numerical code associated with the new program error;
   compare the first numerical code associated with the new program error to one or more stored first numerical codes associated with previously identified program errors to determine whether the new program error is the same as at least one of the previously identified program errors;
   if the first numerical code associated with the new program error is the same as the first numerical code of a previously identified program error, provide stored information associated with resolving the previously identified program error for use in resolving the new program error;
   apply a second operation to at least a second portion of the program stack trace to generate a second numerical code associated with the new program error, the second portion of the program stack trace being a subset of the first portion of the program stack trace; and
   compare the second numerical code associated with the new program error to one or more stored second numerical codes associated with the previously identified program errors to determine whether the new program error is the same as at least one of the previously identified program errors.

2. The system of claim 1, wherein the program stack trace indicates one or more functions in the program that generated the program error and comprises, for each function, a line number of code in the function where the program error was generated.

3. The system of claim 1, wherein the first operation comprises a String.hashCode( ) or Object.hashCode( ) method.

4. The system of claim 1, wherein the first portion of the program stack trace comprises the entire program stack trace, the first operation calculating the first numerical code by determining a unique code for the first portion of the program stack trace.

5. The system of claim 1, wherein the second numerical code associated with the new program error is generated and compared to the one or more stored second numerical codes associated with the previously identified program errors only if the first numerical code associated with the new program error does not match any of the stored first numerical codes associated with the previously identified program errors.

6. The system of claim 1, wherein:
the program stack trace indicates one or more functions in the program that generated the program error and comprises, for each function, a line number of code in the function where the program error was generated; and
the second portion of the program stack trace comprises the entire program stack trace after deleting the line numbers from the program stack trace, the second operation calculating the second numerical code by determining a unique code for the second portion of the program stack trace.

7. The system of claim 1, further operable to:
apply a third operation to at least a third portion of the program stack trace to generate a third numerical code associated with the new program error, the third portion of the program stack trace being a subset of the second portion of the program stack trace; and
compare the third numerical code associated with the new program error to one or more stored third numerical codes associated with the previously identified program errors to determine whether the new program error is the same as at least one of the previously identified program errors.

8. The system of claim 7, wherein the third numerical code associated with the new program error is generated and compared to the one or more stored third numerical codes associated with the previously identified program errors only if the second numerical code associated with the new program error does not match any of the stored second numerical codes associated with the previously identified program errors.

9. The system of claim 7, wherein:
the program stack trace comprises at least three lines and indicates one or more functions in the program that generated the program error and comprises, for each function, a line number of code in the function where the program error was generated; and
the third portion of the program stack trace comprises the first three lines of the program stack trace after deleting the line numbers from the first three lines of the program stack trace, the third operation calculating the third numerical code by determining a unique code for the third portion of the program stack trace.

10. The system of claim 1, further operable to, if the first numerical code associated with the new program error does not match any of the stored first numerical codes associated with the previously identified program errors, store the first numerical code associated with the new program error for use in identifying subsequent program errors.

11. The system of claim 1, wherein providing stored information associated with resolving the previously identified program error for use in resolving the new program error comprises providing one or more of: error-free code; explanatory text; a link to at least one of such code or text; and a uniform resource locator (URL) associated with at least one of such code or text.

12. A method for automatically identifying a program error in a computer program, comprising:
receiving a program error message indicating that a new program error has occurred during execution of the program;
generating a program stack trace for the new program error indicating the source of the new program error within the program;
applying a first operation to at least a first portion of the program stack trace for the new program error to generate a first numerical code associated with the new program error;
comparing the first numerical code associated with the new program error to one or more stored first numerical codes associated with previously identified program errors to determine whether the new program error is the same as at least one of the previously identified program errors;
if the first numerical code associated with the new program error is the same as the first numerical code of a previously identified program error, providing stored information associated with resolving the previously identified program error for use in resolving the new program error;
applying a second operation to at least a second portion of the program stack trace to generate a second numerical code associated with the new program error, the second portion of the program stack trace being a subset of the first portion of the program stack trace; and
comparing the second numerical code associated with the new program error to one or more stored second numerical codes associated with the previously identified program errors to determine whether the new program error is the same as at least one of the previously identified program errors.

13. The method of claim 12, wherein the program stack trace indicates one or more functions in the program that generated the program error and comprises, for each function, a line number of code in the function where the program error was generated.

14. The method of claim 12, wherein the first operation comprises a String.hashCode( ) or Object.hashCode( ) method.

15. The method of claim 12, wherein the first portion of the program stack trace comprises the entire program stack trace, the first operation calculating the first numerical code by determining a unique code for the first portion of the program stack trace.

16. The method of claim 12, wherein the second numerical code associated with the new program error is generated and compared to the one or more stored second numerical codes associated with the previously identified program errors only if the first numerical code associated with the new program error does not match any of the stored first numerical codes associated with the previously identified program errors.

17. The method of claim 12, wherein:
the program stack trace indicates one or more functions in the program that generated the program error and comprises, for each function, a line number of code in the function where the program error was generated; and
the second portion of the program stack trace comprises the entire program stack trace after deleting the line numbers from the program stack trace, the second operation calculating the second numerical code by determining a unique code for the second portion of the program stack trace.

18. The method of claim 12, further comprising:
applying a third operation to at least a third portion of the program stack trace to generate a third numerical code associated with the new program error, the third portion of the program stack trace being a subset of the second portion of the program stack trace; and
comparing the third numerical code associated with the new program error to one or more stored third numerical codes associated with the previously identified program errors to determine whether the new program error is the same as at least one of the previously identified program errors.

19. The method of claim 18, wherein the third numerical code associated with the new program error is generated and compared to the one or more stored third numerical codes associated with the previously identified program errors only if the second numerical code associated with the new program error does not match any of the stored second numerical codes associated with the previously identified program errors.

20. The method of claim 18, wherein:
the program stack trace comprises at least three lines and indicates one or more functions in the program that generated the program error and comprises, for each function, a line number of code in the function where the program error was generated; and
the third portion of the program stack trace comprises the first three lines of the program stack trace after deleting the line numbers from the first three lines of the program stack trace, the third operation calculating the third numerical code by determining a unique code for the third portion of the program stack trace.

21. The method of claim 12, further comprising, if the first numerical code associated with the new program error does not match any of the stored first numerical codes associated with the previously identified program errors, storing the first numerical code associated with the new program error for use in identifying subsequent program errors.

22. The method of claim 12, wherein providing stored information associated with resolving the previously identified program error for use in resolving the new program error comprises providing one or more of: error-free code; explanatory text; a link to at least one of such code or text; and a uniform resource locator (URL) associated with at least one of such code or text.

23. Software for automatically identifying a program error in a program, the software being embodied in computer-readable media and when executed operable to:
receive a program error message indicating that a new program error has occurred during execution of the program;
generate a program stack trace for the new program error indicating the source of the new program error within the program;
apply a first operation to at least a first portion of the program stack trace for the new program error to generate a first numerical code associated with the new program error;
compare the first numerical code associated with the new program error to one or more stored first numerical codes associated with previously identified program errors to determine whether the new program error is the same as at least one of the previously identified program errors;
if the first numerical code associated with the new program error is the same as the first numerical code of a previously identified program error, provide stored information associated with resolving the previously identified program error for use in resolving the new program error;
apply a second operation to at least a second portion of the program stack trace to generate a second numerical code associated with the new program error, the second portion of the program stack trace being a subset of the first portion of the program stack trace; and
compare the second numerical code associated with the new program error to one or more stored second numerical codes associated with the previously identified program errors to determine whether the new program error is the same as at least one of the previously identified program errors.

24. The software of claim 23, wherein the program stack trace indicates one or more functions in the program that generated the program error and comprises, for each function, a line number of code in the function where the program error was generated.

25. The software of claim 23, wherein the first operation comprises a String.hashCode( ) or Object.hashCode( ) method.

26. The software of claim 23, wherein the first portion of the program stack trace comprises the entire program stack trace, the first operation calculating the first numerical code by determining a unique code for the first portion of the program stack trace.

27. The software of claim 23, wherein the second numerical code associated with the new program error is generated and compared to the one or more stored second numerical codes associated with the previously identified program errors only if the first numerical code associated with the new program error does not match any of the stored first numerical codes associated with the previously identified program errors.

28. The software of claim 23, wherein:
the program stack trace indicates one or more functions in the program that generated the program error and comprises, for each function, a line number of code in the function where the program error was generated; and
the second portion of the program stack trace comprises the entire program stack trace after deleting the line numbers from the program stack trace, the second operation calculating the second numerical code by determining a unique code for the second portion of the program stack trace.

29. The software of claim 23, further operable to:
apply a third operation to at least a third portion of the program stack trace to generate a third numerical code associated with the new program error, the third portion of the program stack trace being a subset of the second portion of the program stack trace; and compare the third numerical code associated with the new program error to one or more stored third numerical codes associated with the previously identified program errors to determine whether the new program error is the same as at least one of the previously identified program errors.

30. The software of claim 29, wherein the third numerical code associated with the new program error is generated and compared to the one or more stored third numerical codes associated with the previously identified program errors only if the second numerical code associated with the new program error does not match any of the stored second numerical codes associated with the previously identified program errors.

31. The software of claim 29, wherein:
the program stack trace comprises at least three lines and indicates one or more functions in the program that generated the program error and comprises, for each function, a line number of code in the function where the program error was generated; and
the third portion of the program stack trace comprises the first three lines of the program stack trace after deleting the line numbers from the first three lines of the program stack trace, the third operation calculating the third numerical code by determining a unique code for the third portion of the program stack trace.

32. The software of claim 23, further operable to, if the first numerical code associated with the new program error does not match any of the stored first numerical codes associated with the previously identified program errors, store the first numerical code associated with the new program error for use in identifying subsequent program errors.

33. The software of claim 23, wherein providing stored information associated with resolving the previously identified program error for use in resolving the new program error comprises providing one or more of: error-free code; explanatory text; a link to at least one of such code or text; and a uniform resource locator (URL) associated with at least one of such code or text.

34. A system for automatically identifying a program error in a program, comprising:
means for receiving a program error message indicating that a new program error has occurred during execution of the program;
means for generating a program stack trace for the new program error indicating the source of the new program error within the program;
means for applying a first operation to at least a first portion of the program stack trace for the new program error to generate a first numerical code associated with the new program error;
means for comparing the first numerical code associated with the new program error to one or more stored first numerical codes associated with previously identified program errors to determine whether the new program error is the same as at least one of the previously identified program errors;
means for, if the first numerical code associated with the new program error is the same as the first numerical code of a previously identified program error, providing stored information associated with resolving the previously identified program error for use in resolving the new program error;
means for applying a second operation to at least a second portion of the program stack trace to generate a second numerical code associated with the new program error, the second portion of the program stack trace being a subset of the first portion of the program stack trace; and
means for comparing the second numerical code associated with the new program error to one or more stored second numerical codes associated with the previously identified program errors to determine whether the new program error is the same as at least one of the previously identified program errors.

35. A system for automatically identifying a program error in a program, operable to:
receive a program error message indicating that a new program error has occurred during execution of the program;
generate a program stack trace for the new program error indicating the source of the new program error within the program and indicating one or more functions in the program that generated the program error, the program stack trace comprising at least three lines and, for each function, a line number of code in the function where the program error was generated;
apply a String.hashCode( ) or Object.hashCode( ) method to the entire program stack trace for the new program error to generate a first numerical code associated with the new program error;
apply a String.hashCode( ) or Object.hashCode( ) method to the entire program stack trace after deleting the line numbers from the program stack trace to generate a second numerical code associated with the new program error;
apply a String.hashCode( ) or Object.hashCode( ) method to the first three lines of the program stack trace after deleting the line numbers from the first three lines of the program stack trace to generate a third numerical code associated with the new program error;
compare the first numerical code associated with the new program error to one or more stored first numerical codes associated with previously identified program errors to determine whether the new program error is the same as at least one of the previously identified program errors;
if the first numerical code associated with the new program error does not match any of the stored first numerical codes associated with the previously identified program errors, compare the second numerical code associated with the new program error to one or more stored second numerical codes associated with the previously identified program errors to determine whether the new program error is the same as at least one of the previously identified program errors; and
if the second numerical code associated with the new program error does not match any of the stored second numerical codes associated with the previously identified program errors, compare the third numerical code associated with the new program error to one or more stored third numerical codes associated with the previously identified program errors to determine whether the new program error is the same as at least one of the previously identified program errors.

* * * * *